(No Model.)
H. D. LANFAIR.
HAND DRILL.
No. 544,411. Patented Aug. 13, 1895.
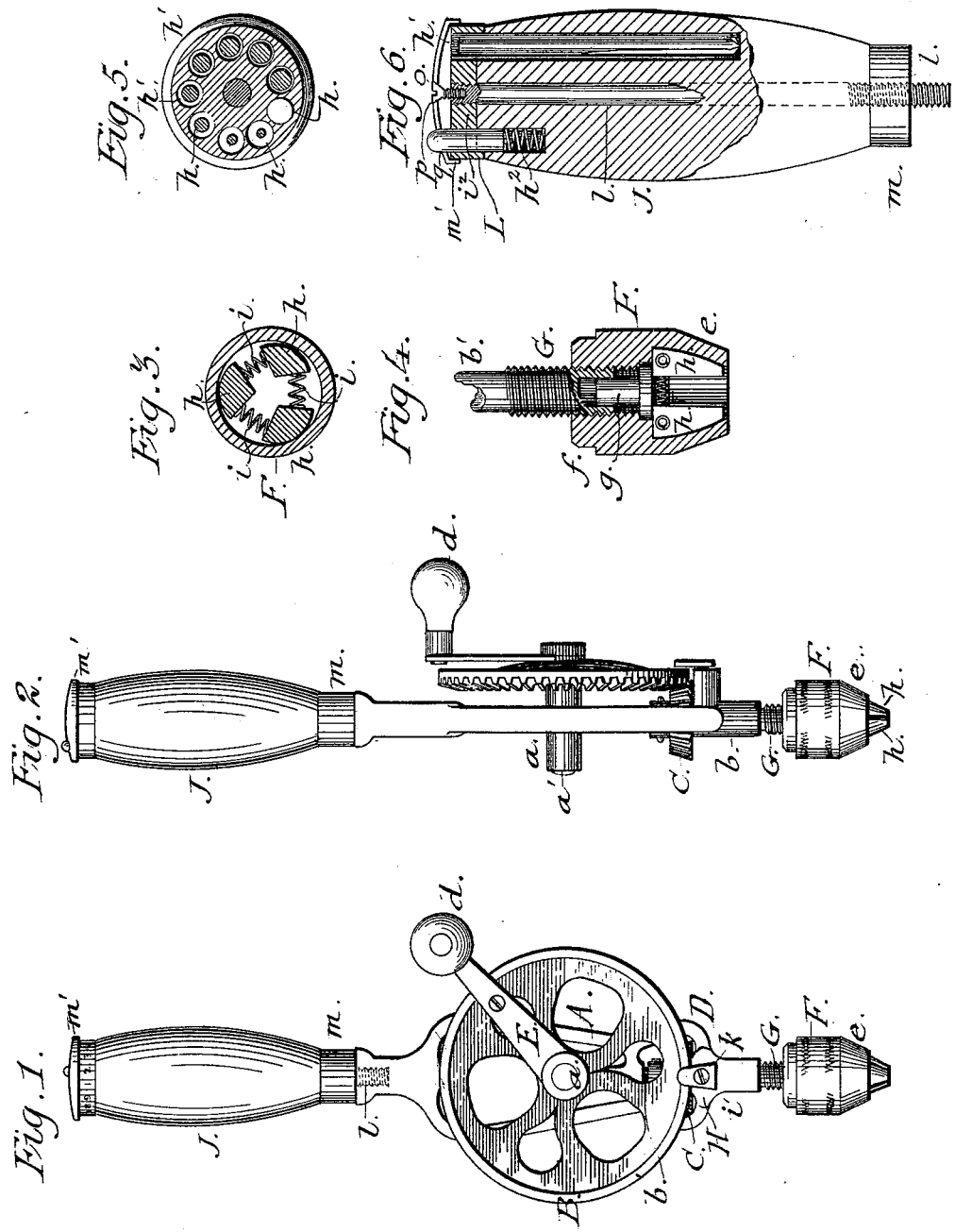
Witnesses:
D. H. Naylor
Finis D. Morris
Inventor:
Herbert D. Lanfair.
By Attorney Edw. W. Downt Co.

UNITED STATES PATENT OFFICE.

HERBERT D. LANFAIR, OF WESTMINSTER, CALIFORNIA, ASSIGNOR TO GOODELL BROTHERS, OF GREENFIELD, MASSACHUSETTS.

HAND-DRILL.

SPECIFICATION forming part of Letters Patent No. 544,411, dated August 13, 1895.

Application filed September 19, 1894. Serial No. 523,484. (No model.)

*To all whom it may concern:*

Be it known that I, HERBERT D. LANFAIR, a citizen of the United States, residing at Westminster, in the county of Orange and State of California, have invented certain new and useful Improvements in Hand-Drills; and I do hereby declare the following to be a full, clear, and exact description of the invention, such as will enable others skilled in the art to which it appertains to make and use the same.

My invention is an improvement in drills chiefly for use of woodworking mechanics.

It has for its object to provide a drill mechanism which will be easy to operate and multiply the revolutions of the drill-bit with reference to those of the crank.

It consists essentially, first, of an improved chuck for the drill wherein the drill-holding jaws are separated by springs and held in place by a housing interiorly screw-threaded and adapted to engage a hollow screw-threaded spindle, which latter incloses the shank of a headed stud which acts upon the several parts of the jaws of the chuck when the said housing is moved axially.

It consists, secondly, of an improved drill-holder or handle for the drill wherein a screw-bolt running through said holder centrally connects with a disk-plate at one end and the frame of the drill at the opposite end, the purpose of said construction being to strengthen the said handle and thus improve its usefulness.

In the drawings, illustrating my invention, Figure 1 shows a front elevation of the tool complete. Fig. 2 shows a side elevation of the same. Fig. 3 is a transverse section of the chuck or bit-holder. Fig. 4 is a longitudinal section of the same. Figs. 5 and 6 are views showing the receptacle for the bits.

Similar letters of reference indicate like parts in all of the figures.

Referring to the drawings, A is the frame of the drill, formed of metal, preferably, and arranged with axis sockets $a$ and $b$ for shafts $a'$ $b'$. To the shaft $a'$ is fixed a large bevel gear-wheel B, and to the shaft $b'$ is fixed a smaller bevel gear-wheel C. The shaft $b'$ is housed in the portion D of the frame A and is screw-threaded on its end which enters the chuck. This shaft $b'$ is hollow at its chuck end for a purpose hereinafter to be mentioned. An arm E, provided with a handle $d$, is fixed at two points of the bevel-wheel B, serving as a crank with which, in the hands of the operator, the two bevel-wheels and the drill-chuck are moved.

The drill-chuck is composed of the housing F, having a conical end $e$; an interior screw-threaded end $f$; a hollow cylindrical sleeve G, screw-threaded outwardly and inwardly, fitting within the screw-threaded portion of the housing F; a stud $g$, having a head which fits in an annular rabbet in said sleeve and a shank which fits in the hollow portion of said sleeve; chuck-jaws $h$ $h$ $h$ held to place within said housing, and spiral springs $i$ $i$ $i$, which hold said jaws $h$ relatively to position. Normally the jaws of the chuck are entirely within the housing F and below the end surface of its conical end. The hollow screw-threaded cylindrical sleeve G is a part of the shaft $b'$ and is united by screw-threads to the housing D. The stud $g$, seated within the sleeve G, normally bears by its head against the bases of the jaws $h$ $h$ $h$, so that when the sleeve G is screwed down with the shaft $b'$ into the housing F the chuck-jaws are drawn together, they being limited in lateral movement by the conical end of the said housing F. When the chuck-housing is turned backward, the jaws $h$ are released from contact with the stud $g$ and opened by the separating spiral springs $i$.

The frame of the drill has near the junction of the two bevel gear-wheels a stud H, and secured to said stud by a screw $k$ is a plate I, which bears normally against the outer edge of the large bevel-wheel B, holding the latter to contact with the smaller bevel-wheel C. By drawing the screw $k$ slightly, the plate I may be thrown from the wheel B and said wheel may be readily separated, with its shaft, from the frame A.

The handle of the drill has a body J, composed preferably of wood worked out to a suitable form for the hand of the operator, and it has running through it longitudinally at its axis the screw-bolt $l$, which projects from the smaller end. A ferrule $m$ finishes the small end of the handle. The frame A of the drill, at its end opposite the chuck end, is fashioned to receive the screw-bolt $l$ and the ferrule $m$, so that the handle and frame may be firmly united. The wooden portion of the handle of the drill is provided with the several cylindrical cells $h'$ formed longitudinally with it, arranged in a concentric circle. One of these cells is furnished with a spiral spring $h^2$ to cushion a round-headed stud which extends upward through a fixed metallic plate $i^2$ perforated correspondingly with the cells of the handle. In the end of the screw-bolt $l$ is a screw-threaded hole into which fits a screw $o$. A capping-plate $m'$, provided with holes $p\ q$, is secured to the screw-bolt by screw $o$. The capping-plate $m'$ may be revolved about its axis, and drills arranged in the several cells may be dropped out one at a time. A band L is secured to the large end of the handle, and formed upon it are figures 1 2 3 4 5, &c., indicating the numerals of the drills in cells respectively opposite.

Having thus described my invention, what I claim as new, and desire to secure by Letters Patent, is—

1. The chuck composed of the following parts, viz: jaws, in three or more parts, of wedge form, rectangular at their bases, held apart by separating springs, a stud and a spindle arranged to receive said stud, a housing or shell having a cavity of form to receive the several parts of the jaws, the headed stud and a screw-threaded spindle, all arranged and combined as set forth.

2. The combination with the chuck composed of jaws, springs, a headed stud and a housing or shell, all formed as described, of the hollow screw-threaded spindle, as set forth.

3. In combination, the drill holder, the plate $i^2$, the bolt $l$ screwed into said plate $i^2$ running entirely through the handle and the frame of the drill secured to said bolt, as specified.

In testimony whereof I affix my signature in presence of two witnesses.

HERBERT D. LANFAIR.

Witnesses:
R. E. LARTER,
W. H. WILLIAMS.